No. 783,332.	Patented February 21, 1905.

UNITED STATES PATENT OFFICE.

MASSIMO TOMELLINI, OF GENOA, ITALY.

PROCESS OF SOLDERING ALUMINIUM.

SPECIFICATION forming part of Letters Patent No. 783,332, dated February 21, 1905.

Application filed March 17, 1903. Serial No. 148,271.

*To all whom it may concern:*

Be it known that I, MASSIMO TOMELLINI, of Migliarina, a suburb of Spezia, Genoa, in the Kingdom of Italy, have invented certain new and useful Improvements in Processes of Soldering Aluminium of Whatever Form and Shape, of which the following is a specification.

The present invention relates to a new process for soldering parts of aluminium together, no matter of what shape—plates, leaves, pipes, &c.

The difficulties to be overcome in soldering aluminium parts are well known, and it has been impossible heretofore to unite the parts by using a solder consisting exclusively of aluminium or of an alloy composed principally of aluminium, having only a small addition of another metal, so that the color of the solder does not materially differ from the metal of the parts to be united. It is evident that such solder has not the same durability and power of resistance as a solder composed almost exclusively of aluminium and that the color of such solder always marks the joints most decidedly. It has been difficult to unite pieces of aluminium by means of this kind of solder, though it is very easily fusible, and the most careful preparation and cleaning of the metal parts was necessary, and the solder required much friction to be readily spread on the parts to be united. A soldering-iron of pure aluminium has been proposed for this purpose of spreading the solder and to prevent sticking to the soldering-iron or forming alloy with the same. I found this to be a great mistake, for it is evident when the solder does not readily combine with the material of the soldering-iron, being aluminium, it can not readily unite with the parts of this metal which are to be united. I therefore employ in my process as a soldering-iron a rod of a metal which fuses at a high temperature, which is a good conductor of heat, and which will readily alloy with aluminium—for instance, copper. I thereby succeed in uniting two pieces of aluminium even without employing any solder, simply fusing the parts together at the contacting points. The aluminium when commencing to fuse at the joint takes up a small quantity of the metal of the soldering-rod, and this makes it flow more easily. In the same way I can use solder of pure aluminium in the form of granules, grains, or coarse powder, which will flow at the proper temperature when coming in contact with the soldering-rod. It is evident that the flow of the solder can be obtained still more readily when a small quantity of tin is alloyed with the aluminium before it is granulated into solder.

In executing my new process I proceed in the following manner: As a source of heat I preferably employ a blowpipe and a flame of any of the gases ordinarily used for soldering purposes; but I dry the gases very carefully, and I pass them through a body of ice-cold water to clean them. Whenever it is suitable, I use a bed of charcoal to place the pieces to be soldered upon in order to keep them warm while the blowpipe-flame is directed on the parts; but the charcoal bed is not absolutely necessary. When the parts at the place to be soldered have almost the temperature at which aluminium fuses, I approach the joint with the point of the soldering-rod, which is of a metal of a higher fusing-point than aluminium, which is a good conductor of heat, and capable of readily alloying with aluminium. A rod of copper is most suitable for the purpose. I now direct the flame of the blowpipe or the heat of any other caloric source upon the rod, so that it may transfer more heat to the parts of the joint, and thereby fuse the aluminium at the joint. In going carefully along the joints to be soldered the aluminium readily fuses in combining with the metal of the soldering-rod. However, the aluminium can take up very little of the metal of the rod by reason of the higher fusing-point of the latter. Therefore it absorbs of the foreign metal only such a small quantity that the alloy formed is not in any way discolored, and consequently that after the union of the soldered pieces the seam cannot be detected.

Having thus described my invention, what

I claim as new, and wish to secure by Letters Patent of the United States, is—

1. Process of soldering parts of aluminium which consists in cleaning the parts to form the joint and fitting them nicely together, then heating them at the joint to almost the fusing temperature of aluminium, then applying at the joint a rod of a metal having a higher fusing-point than the aluminium, and heating the same to a temperature higher than the fusing of aluminium so that the aluminium at the joint and the aluminium oxid formed by the heating process may be fused and may alloy with the surface parts of the soldering-rod and thereby flow more easily, substantially as described.

2. Process of soldering parts of aluminium which consists in cleaning the parts to form the joint and fitting them nicely together, providing the joint with granules of pure aluminium, then heating them at the joint to almost the fusing temperature of aluminium, then applying at the joint a rod of a metal having a higher fusing-point than the aluminium, and heating the same to a temperature higher than the fusing of aluminium so that the granules and the aluminium at the joint and the aluminium oxid formed by the heating process may be fused and may alloy with the surface parts of the soldering-rod and thereby flow more easily, substantially as described.

3. Process of soldering parts of aluminium which consists in cleaning the parts to form the joint and fitting them nicely together, providing the joint with granulated aluminium alloy composed substantially of aluminium and a small addition of tin, then heating them at the joint to almost the fusing temperature of aluminium, then applying at the joint a rod of a metal having a higher fusing-point than the aluminium, and heating the same to a temperature higher than the fusing of aluminium so that the aluminium tin-alloy and the aluminium at the joint and the aluminium oxid formed by the heating process may be fused and may alloy with the surface parts of the soldering-rod and thereby flow more easily, substantially as described.

In testimony whereof I have signed my name to this specification in the presence of two subscribing witnesses.

MASSIMO TOMELLINI.

Witnesses:
CLAUDIO GROPPO,
CAGLIAFERRO RUIGI.